Dec. 19, 1950  B. O. AUSTIN ET AL  2,534,895
AUXILIARY POWER SYSTEM FOR AIRCRAFT
Filed Feb. 28, 1948
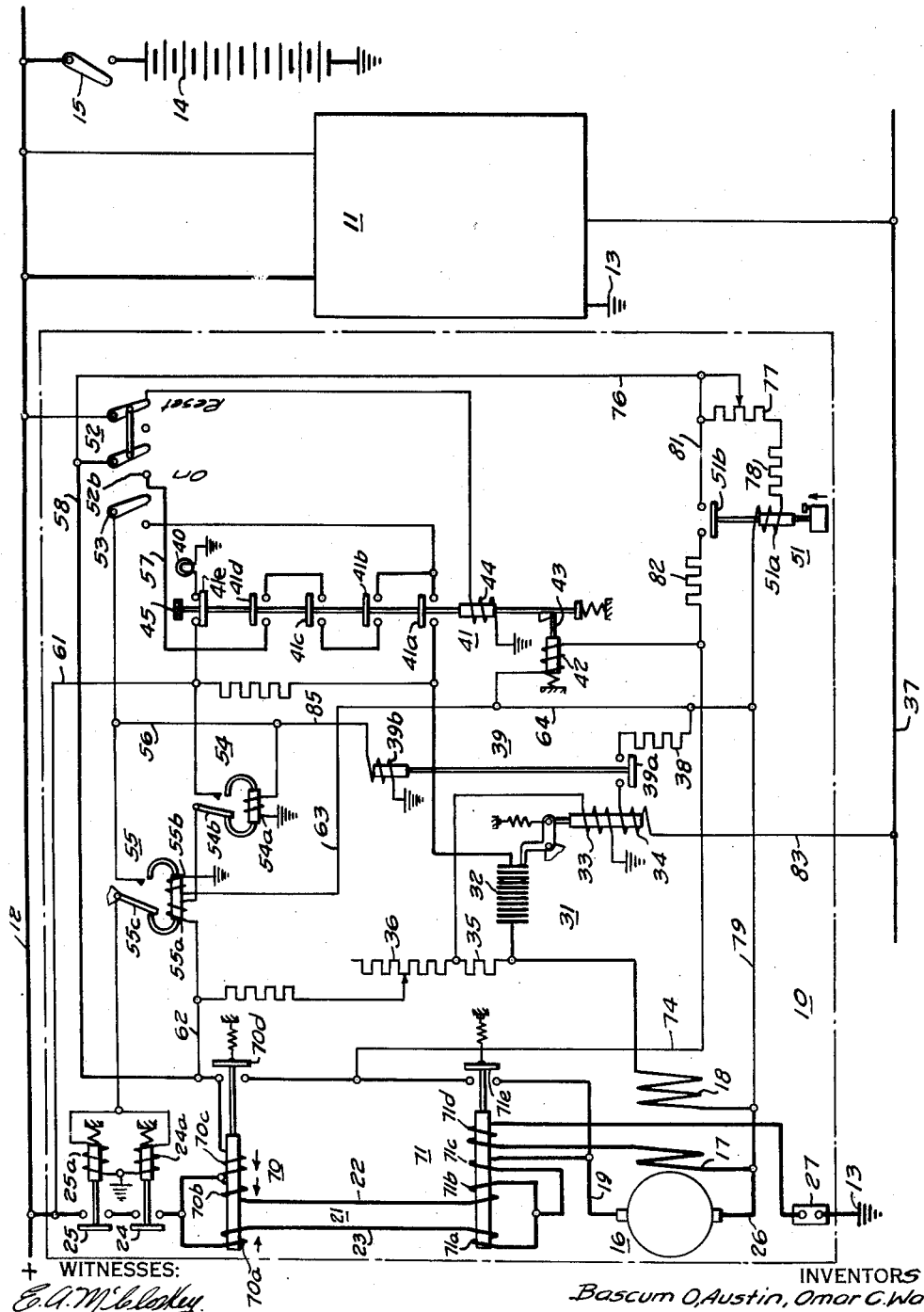
WITNESSES:
E. A. McCloskey
New. C. Groome
INVENTORS
Bascum O. Austin, Omar C. Wolley
and Donald W. Exner.
BY G. M. Crawford
ATTORNEY Patented Dec. 19, 1950

2,534,895

UNITED STATES PATENT OFFICE 2,534,895

AUXILIARY POWER SYSTEM FOR AIRCRAFT

Bascum O. Austin and Omar C. Walley, Lima, Ohio, and Donald W. Exner, Seattle, Wash., assignors to Westinghouse Electric Corporation, East Pittsburgh, Pa., a corporation of Pennsylvania Application February 28, 1948, Serial No. 12,118

15 Claims. (Cl. 171—119)

Our invention relates, generally, to auxiliary electric power systems for aircraft of the type employing a plurality of engine-driven direct-current generators for supplying power to a load bus and, more particularly, to a control and protective system for such generators and system.

Systems of this general nature have been used heretofore employing direct-current generators of relatively low capacity and voltage on the order of from $\frac{1}{12}$ to $\frac{1}{15}$ of the present-day requirements as to capacity and of about 12 volts. The generators now required for larger aircraft have a wide-speed range, being driven by the aircraft engines and operate at about 28 volts. These generators are capable of sustaining relatively high fault currents of more than 5,000 amperes at 30 volts. In addition, these generators are of large capacity as compared to the capacity of the storage battery connected to the load bus. The number of electrically operated devices has been increased and many of the electrical requirements are vital to successful flight operations. Accordingly, it is essential that the continuity of electric power be maintained under all operating conditions. This requires more reliable control and protective features than were heretofore considered necessary in connection with the lower capacity and lower voltage systems. Reliable control and protective features both during normal service and under conditions where faults occur are necessary as faults in the electrical system may have serious consequences if not properly controlled. It is to this general problem of control and protection for auxiliary power systems of relatively large capacity and high voltage that our invention is primarily directed.

Accordingly, the object of our invention, generally stated, is to provide a control and protective system for aircraft generators and generating systems which shall be of simple and economical construction and which is safe and reliable in operation.

A more specific object of our invention is to provide for positively and automatically disconnecting a generator of the character described from the power or load bus in response to any one of a number of different kinds of faults which may develop in the generator, the generator leads or feeder cables which connect the generator to the load bus and the control system itself.

A further object of our invention is to provide for automatically disconnecting any one of the several generators which may be operating in parallel supplying power to a common load bus from the load bus in response to generator overvoltage or fault in the generator, generator leads or feeder cables and for maintaining the generator in a disconnected condition until its associated control apparatus is reset to normal operating condition.

Another object of our invention is to provide, in a system of the character described, for utilizing a single latch type manually controlled reset field relay for effecting the disconnection of a generator from the load bus and the opening of its field circuit in response to the operation of protective relays individually responsive to generator overvoltage and faults occurring in the generator, generator leads, feeder cables, and the control circuits.

A still further object of our invention is to provide for automatically controlling the connection of an incoming generator to the load bus to which other generators of a similar nature are supplying power or to which a battery is connected in such manner as to effect the connection of the generator only in the event that the generator voltage is of the correct polarity and value with respect to the bus voltage.

Another object of our invention is to provide a visual indication of the operation of the field relay in a system of this kind to indicate the occurence of a fault condition.

These and other objects of our invention will become more apparent from the following detailed description of a preferred embodiment thereof when read in conjunction with the drawing, in which the single figure is a diagrammatic view of an auxiliary power supply system embodying the principal features of our invention.

In practicing our invention in its preferred form, the several generators of a multi-generator system are arranged to be connected in parallel circuit relation between the load bus and ground, to which a storage battery is also usually connected. Each generator is connected through a pair of line switches or contactors in series which are controlled simultaneously as one switch. The generators are individually driven by the engines of the plane in a known manner and are provided with series and shunt field windings. The excitation of the shunt field windings of the generators is controlled by voltage regulators having paralleling windings connected together through a common equalizer bus so as to effect a proper load division between generators. Each generator is provided with an equalizer disconnect relay which operates when its associated generator is shut down for any reason to open its connection to the equalizer bus. Each generator is also provided with a polarized voltage relay and a polarized differential relay which function together in connecting the generator to the load bus in response to the operation of the generator switch. The polarized voltage relay functions to prevent operation of the polarized differential relay until the generator voltage is of a predetermined value or within a predetermined range and of the correct polarity. The polarized differential relay prevents closure of the line contactors until the generator voltage exceeds the bus voltage by a predetermined amount. This relay also functions as a reverse current cutout or relay.

The field circuit of each generator is controlled by a field relay of the latch type which is electrically tripped to its open position and electrically or manually reset to its closed position. A manually operated reset switch controls the reset winding when operated to one position. Each generator is also provided with an overvoltage relay having inverse timing characteristics operable to remove its associated generator from the bus in the event of overvoltage by tripping the field relay. In addition, each generator has protective relays associated therewith operable in response to generator lead, feeder bus and control system faults to also trip the field relay and thus disconnect the generator from the bus. These relays are of the differential type and are so connected in the main circuit of the generator as to be unaffected by load current or reverse power current.

Referring now to the drawing, which shows a multi-generator power supply system, there is shown a pair of generator units 10 and 11 disposed to be connected in parallel circuit relation between a power or load bus 12 of positive potential and ground, illustrated by the usual symbol 13. The system also may include a battery 14 having one terminal connected to the ground 13 and the other to the bus 12 through a suitable switch 15.

Since the generator units of the system are substantially identical insofar as the number and arrangement of the various parts are concerned, only one unit has been illustrated in detail and this particular unit will be described in detail. Reference will be made generally to the other unit 11, which is symbolic of one or more additional units, insofar as it is necessary to describe the operation of the system as a whole.

Referring to the unit 10, for example, it comprises a direct-current generator 16 having a series field winding 17 and a shunt field winding 18 forming a compound wound generator. The generator is disposed to be driven by one of the engines (not shown) of the plane in the usual manner to supply direct-current power at a voltage of approximately 30 volts to the bus 12.

In this instance, the positive terminal of the generator is connected to the bus 12 through one of the generator leads 19, a feeder circuit 21 comprised of parallel conductors 22 and 23 and a pair of line switches or contactors 24 and 25 connected in series circuit relation as shown. The negative terminal of the generator is connected to ground 13 through the other generator lead 26, series field winding 17 and an ammeter shunt 27.

The use of double or series-connected line contactors 24 and 25 is one of the new features of our invention. This arrangement provides a double break in the main circuit of the generator so as to provide for positively opening the generator circuit in response to the occurrence of a fault or a manual operation. Where a single line contactor is used, frozen contacts may not cause trouble during flight unless a fault occurs which would normally cause the contactor to open. Also, after landing and shut down of the engines of the plane, the pilot may fail to open the battery switch in which case a frozen contactor will cause complete discharge of the battery. Such may not result in damage to the generator unless another source of power is plugged into the system.

Any possible damage from these causes is eliminated by the use of the double contactor arrangement because they are controlled simultaneously as one contactor and due to the slight differences which occur in the magnetic circuits, springs and other parts of these devices the two contactors will never open or close at exactly the same instant. One contactor operates normally and the other functions as a back-up switch. In the event of failure of the normally operating contactor, the other is immediately available for instantaneous operation.

The generator 16, as well as each of the other corresponding generators of the system, are provided with a voltage regulator 31 of known construction for maintaining a substantially constant generator voltage. The regulator 31 controls the energization of the shunt field winding 18 in accordance with its voltage setting. In this instance, a carbon-pile regulator is illustrated although any other suitable type may be used.

The regulator comprises a resistance element in the form of a carbon stack 32 connected in series circuit relation with the shunt field winding, a main operating winding 33, an auxiliary or paralleling winding 34, a stabilizing resistor 35 and a voltage adjusting rheostat 36. The main operating winding 33 is connected between a conductor connected to the positive terminal of the generator and ground. The paralleling winding 34 is connected between the negative terminal and an equalizer bus 37 through a ballast resistor 38 and the contact members of an equalizer disconnect relay 39, the function of which will be described hereinafter.

It will be readily understood that all of the regulators of the system are so connected to their respective generators and to the common equalizer bus 37 that the main windings 33 function to cause the regulators to maintain the desired generator voltage and the paralleling windings 34 function to cause the regulators to maintain the desired load division between those generators which are connected to the bus.

Among the most important features of our invention are those relating to the protection of the generator, its main power leads, the feeder circuit and the control system generally. The control and protective features of the system are built around a field relay 41 of the latch-closed type having a trip winding 42 which operates the holding latch 43 and a reset or closing winding 44 which operates the relay to its reset or closed position. This relay may be reset manually by the reset button 45 and is provided with contact members 41a to 41e.

As will be described more in detail hereinafter, the field relay 41 functions when in its closed or reset position to complete the field circuit of the generator through its contact members 41a, and partially establish the control operating circuit for the line contactors 24 and 25. In its tripped or open position, it completes an energizing circuit for an indicating device, in the form of a lamp 40, through its contact members 41e. Thus it will be apparent that whenever the field relay is tripped, its associated generator is disconnected from the bus 12 and its field circuit opened.

In order to protect against overvoltage conditions, each generator is provided with an overvoltage relay 51 which is connected to be responsive to the generator voltage and is preferably of the inverse time characteristic type. In other words, this relay is so constructed that its time of operation or closing varies inversely with respect to the degree of overvoltage. As will be described more in detail, the overvoltage relay functions to trip the field relay 41 to disconnect the generator from the load bus and also open its field circuit.

It will be apparent that overvoltage protection in a system of this kind is important for the reason that the ratio of the capacity of the system to the capacity of the battery determines the extent of overvoltage which can exist. On low capacity systems, the battery could take a relatively high charging current for a considerable length of time thus loading the generators and preventing an excessive rise in the generator voltage. In larger capacity systems of the kind herein contemplated, the capacity of the generators is so great as compared to that of the battery that definite protection against overvoltage is necessary. Such overvoltage conditions usually result from faulty regulator operation or from broken leads, shorted terminals and any fault which may increase the generator field current beyond the point where it can be controlled by the regulator.

As will be described later, each generator is also provided in accordance with common practice with reverse current protection. In the case of persistent overvoltage of any one generator, the result is that reverse current will flow in the circuits of those generators which are being regulated for normal voltage. This will cause these generators to be automatically disconnected from the bus by their reverse current relays which causes the voltage of the faulty generator to rise still higher. This results in the immediate disconnection of the faulty generator and the immediate reconnection of the normal operating generators.

The reset winding 44 of the field relay may be controlled by a reset switch 52 having a reset position as shown which effects the energization of the reset winding 44, and an "on" position which partially closes the energizing circuit to the operating windings 24a and 25a of the line contactors. In addition to this switch, a generator switch 53 is provided which may be utilized to individually control the connection of each generator to the load bus 12.

In order to provide for connecting the generator 16 to the bus 12 only when its voltage is of proper polarity and value, a polarized voltage relay 54 and a polarized differential relay 55 are provided. The polarized voltage relay is provided with a winding 54a connected between ground 13 and the positive terminal of the generator through conductor 56, switch 53, contact members 41b, 41c and 41d in series, conductor 57, contact members 52b, and conductor 58. Thus, this relay is responsive to a generator voltage of predetermined magnitude and polarity and its closure is utilized to render the polarized differential relay 55 effective. This relay is provided with an operating winding 55a and a reverse current winding 55b so that it functions both as a voltage checking relay and a reverse current relay. Its operating winding 55a is connected to be responsive to the difference between the voltage of the bus 12 and the generator 16. Its connection extends from the bus 12 through conductor 61, contact members 54b, winding 55a, and conductor 62 to the feeder conductor 22.

It will be apparent that contact members 55c of the polarized differential relay function to finally close the energizing circuit for the operating coils 24a and 25a of the line contactors.

The reverse current winding 55b is connected between ground and the negative terminal of the generator through conductors 63 and 64 so that this relay responds to the flow of reverse current and thus opens the operating circuit of the contactors 24 and 25.

When the generator is running under normal conditions, it is desirable to provide protection against the occurrence of faults, such as grounds in the control system, the generator, the generator leads and the feeder circuit 21.

Generator and generator lead faults occur infrequently, but protection is necessary in high capacity systems of the type contemplated by our invention. The same is true with respect to faults occurring in the feeder cables 22 and 23 which connect the generator to the bus. These faults may be extremely serious when they do occur.

In this instance, feeder protection is obtained by using the two feeder cables 22 and 23 in parallel and a pair of differential relays 70 and 71 so connected that any unbalance in the flow of current in the feeder cables will effect the operation of one or the other of the relays.

As shown, the relay 70 is provided with main series windings 70a and 70b and an auxiliary winding 70c. The relay 71 is provided with series windings 71a, 71b, 71c and 71d. A series winding of each relay is connected in series circuit relation with each of the feeder cables. A ground fault on either cable at any point will cause a current unbalance in either one or both of these relays.

The relays are provided with normally open contact members 70d and 71e which are connected between the positive terminal of the generator and the trip winding 42 of the field relay through conductor 74. It will be understood that the operation of either relay closes this circuit to energize the trip winding and thus disconnect the generator from the bus and also open its field circuit.

The auxiliary winding 70c on relay 70 is connected to be responsive to the control current supplied by the generator for operating the various relays of the system. All of the control conductors which receive their energy from the positive terminal of the generator are connected thereto through this winding. In the event of the occurrence of a fault on any of the control conductors or relays of the system, the relay 70 is actuated to effect the tripping operation of the field relay.

The relay 71 is also used as a protective relay for the generator and generator leads. The additional windings 71c and 71d of this relay are connected in series circuit relation with the generator leads as shown and thus function to close contact member 71e in response to any unbalance in the flow of current on opposite sides of the generator. The two pairs of coils 71a—71b and 71c—71d are opposed as indicated by the arrows so that the relay can be made sensitive to any small unbalance in current flow through either pair of coils.

Since the coils of relays 70 and 71 are normally connected in balanced circuits, it will be apparent that the relays are not affected in any way by the amount of current flowing in the generator circuit between the bus 12 and ground. Accordingly, they are not responsive in any way to load current or reverse current.

The voltage relay 51 referred to hereinbefore is connected to be responsive to the voltage of the generator. As shown, its operating winding 51a is connected by a circuit extending from the feeder bus 21, through winding 70c, conductors 58 and 76, variable resistor 77, fixed resistor 78, winding 51a and conductor 79 to the negative generator lead 26. This relay is of the type which has an operating or closing time which varies inversely with the voltage so that for approximately 33 volts its closing time is one to three seconds and at 60 volts about $1/100$ second. This provides fast protection under high overvoltage conditions which is necessary to avoid damage.

When the contact members 51b of the voltage relay close, an obvious energizing circuit is completed for the trip winding 42 of the field relay extending from the positively energized conductor 76 through conductor 81, contact members 51b, resistor 82, trip winding 42 and conductor 84 to the negative generator lead 26.

As stated hereinbefore, the equalizer disconnect relays 39 of the system function to control the connection of the paralleling coils 34 of the regulators to the equalizer bus 37. This connection extends from the bus 37 through conductor 83, paralleling winding 34, contact members 39a, ballast resistor 38 and conductor 79 to the negative generator lead 26.

The operating winding 39b of this relay is connected between ground and the control conductor between the generator switch 53 and contact members 55c, which is energized when the generator switch is closed, through conductors 85 and 56. Thus, relay 39 is automatically opened when the generator is shut down by opening the generator switch 53 or the field relay 41.

This operation of the equalizer relays prevents operation of the system at low voltage when one or more of the generators are shut down. If a generator is shut down without opening the circuit to the paralleling winding of its voltage regulator, its equalizer connection does not furnish any equalizer voltage. This results in a lower than normal system voltage as the remaining connected generator or generators must assume additional load, but their associated voltage regulators are functioning to reduce their load through the operation of the equalizer circuit.

The operation of the system may be described as follows. With the generator being driven by the engine (not shown) and the field relay 41 closed, the shunt field winding of the generator is energized and under the control of the regulator 31. When the voltage builds up to the proper value as determined by the polarized relay 54, its contact members 54b are closed and the polarized differential relay 55 rendered responsive to the difference between the bus and generator voltages. When the generator voltage exceeds the bus voltage by the proper amount, contact members 55c close to finally complete the energizing or operating circuit for the line contactors 24 or 25. This is the normal operating condition of the system.

The field relay 41 is tripped as described hereinbefore in response to the occurrence of any one of a condition of overvoltage or a fault in the feeder, the generator or its leads, or the control system itself. When this occurs, the field relay functions to not only interrupt the control circuit for the line contactors at its contact members 41b, 41c and 41d, but also to interrupt the energizing circuit for the generator field winding at its contact members 41a. This not only disconnects the generator from the bus, but reduces its voltage to zero. The generator cannot be reconnected until after the voltage relay has been reset by operation of the reset switch 52 or the manual reset button 45. It will be apparent that this prevents any pumping operation. In other words, the system is trip free and will not automatically operate to attempt to reconnect the disconnected generator to the bus.

It will be apparent, however, that when the generator is disconnected from the bus in any other manner such as by opening the generator switch 53, it may be reconnected by simply closing this switch without a reset operation. The only condition under which a resetting operation of the field relay 41 is required is that resulting from a fault of such nature as to operate relays 51, 70 and 71.

In the event that the generator is at any time disconnected from the bus through the operation of the polarized differential relay 55 in response to reverse current, it will be automatically reconnected by the relay 55 as soon as it again develops proper terminal voltage.

In view of the foregoing, it will be apparent that we have provided an auxiliary power system for aircraft which embodies all of the protective and control features necessary to protect and control the operation of the complete system. The system is automatically protected from the occurrence of a fault in any part thereof and the control of each generator is such that it cannot be connected to the bus until the proper voltage and polarity conditions prevail. The fault protection is centered about a single field relay which is automatically tripped in response to the operation of any fault relay. Since this relay is of the latch type, its automatic tripping operation to open position provides a trip-free system.

While we have illustrated and described a detailed embodiment of our invention, it is to be understood that the principles thereof may be embodied in other systems and arrangements without departing from the teachings of the invention.

We claim as our invention:

1. In combination, a plurality of direct-current generators for supplying power to a common load bus, electrically-interconnected voltage regulators individual to each generator for normally maintaining predetermined output voltages of the generators and load division therebetween, switch means operable to connect each generator to the load bus, and control means for controlling the operation of each switch means, said control means including first and second polarized relay means jointly responsive to the magnitude and polarity of the generator voltage operable to render said control means effective to operate the switch means to connect the generators to the load bus only in the event that the polarity and magnitude of the voltage is in predetermined relation to the polarity and magnitude of the voltage of the load bus.

2. In combination, a plurality of direct-current generators for supplying power to a common load bus, electrically-interconnected voltage regulators individual to each generator for normally maintaining predetermined output voltages of the generators and load division therebetween, switch means operable to connect each generator to the load bus, and control means for controlling the operation of each switch means, said control means including a first relay operable to render the control means effective to operate the switch means in response to the generator voltage exceeding the bus voltage by a predetermined amount and a second relay operable to render the first relay effective in response to the generator developing a voltage of predetermined polarity.

3. In combination, a direct-current generator for supplying power to a load bus through connecting conductors, said generator having a field winding, a voltage regulator for controlling the excitation of the field winding to maintain a predetermined output voltage of the generator, electrically-operated switch means for connecting the generator to the load bus, a field relay operable to control the energizing circuits of the field winding and switch means, and a voltage relay operable in response to the voltage of the generator exceeding a predetermined value to actuate the field relay to its open position to open the energizing circuits of the field winding and switch means.

4. In combination, a direct current generator for supplying power to a load bus through connecting conductors, said generator having a field winding, a voltage regulator for controlling the excitation of the field winding to maintain a predetermined output voltage of the generator, electrically-operated switch means for connecting the generator to the load bus, a field relay for controlling the energizing circuits of the field winding and switch means, said field relay having electrically operated tripping means for effecting the opening thereof to interrupt the excitation circuits of the field winding and switch means, and a voltage relay connected to be responsive to the generator voltage operable in response to the generator voltage exceeding a predetermined value to effect the energization of the tripping means of the field relay.

5. In combination, a direct-current generator for supplying power to a load bus through connecting conductors, said generator having a field winding, a voltage regulator for controlling the excitation of the field winding to maintain a predetermined output voltage of the generator, electrically-operated switch means for connecting the generator to the load bus, a field relay for controlling the energizing circuits of the field winding and switch means, said relay being normally closed to complete the field circuit and having electrically-operated trip means, and relay means operable in response to the occurrence of a fault in the generator or its connecting conductors to effect the operation of the tripping means.

6. In combination, a plurality of direct-current generators for supplying power to a common load bus, electrically interconnected voltage regulators individual to each generator for normally maintaining predetermined output voltages of the generators and predetermined load division therebetween, electrically operated line switch means operable to connect each generator to the load bus through generator leads and a feeder circuit, a field relay for controlling the field circuit of each generator, said relay having electrically operated latch means for holding it in the closed position and a closing winding, a reset switch operable to one position to energize the closing winding of the field relay of each generator and to a second position to complete excitation circuits for the generators, a control switch individual to each generator, relay means rendered effective in response to the closure of the control switch of each generator and operable in response to predetermined voltage conditions of the generator, and load bus for effecting closure of the line switch means to connect its associated generator to the load bus, and relay means operable in response to a fault in each generator, its leads or feeder circuit to effect the energization of the latch means of the field relay, thereby to open the field circuit and deenergize the line switch means.

7. In combination, a direct-current generator having a field winding for supplying power to a load bus, said generator being connected to the load bus through single generator lead conductors and a multiple conductor feeder circuit, electrically-operated switch means for connecting the generator to the load bus through said single generator lead conductors and feeder circuit, a normally closed field relay for controlling the energizing circuits of the generator field winding and the switch means, said relay having an electrically operated trip means, relay means responsive to the occurrence of a fault in the generator or generator lead conductors operable to effect the energization of the tripping means, and additional relay means responsive to the occurrence of a fault in the feeder circuit also operable to effect the energization of the tripping means.

8. In combination, a direct-current generator having a field winding for supplying power to a load bus, said generator being connected to the load bus through single generator lead conductors and a multiple conductor feeder circuit, electrically-operated switch means for connecting the generator to the load bus through said single generator lead conductors and feeder circuit, a normally closed field relay for controlling the energizing circuits of the generator field winding and the switch means, said relay having an electrically operated trip means, a first current responsive differential relay operable in response to the occurrence of a fault in that part of the generator circuit including the generator and its lead conductors to effect the energization of the trip means, said relay having one pair of exposed current coils each connected to be energized in accordance with the current flowing in a lead conductor, said relay having another pair of opposed current coils connected to be responsive to the current flowing in the feeder conductors at one end of the feeder circuit, and a second current responsive differential relay having a pair of opposed coils connected to be energized in accordance with the current flowing in the feeder conductors at the other end of the feeder circuit also operable to effect energization of the tripping means.

9. In combination, a direct-current generator having a field winding for supplying power to an energized load bus through lead conductors, electrically operated main switch means for connecting the generator to the load bus, a voltage regulator operable to control the excitation of the field winding, energizing circuits for the switch means and field winding, a field relay for controlling said energizing circuits, said relay having electrically-operated latch means for holding it in closed position and a reset coil operable when energized to actuate the relay to its closed and latched position, manually operable switch means for closing and opening the energizing circuit for the main switch means, and a reset switch operable to one position to energize the reset coil of the field relay and to another position to complete the energizing circuit for the main switch means.

10. In combination, a direct-current generator having a field winding for supplying power to an energized load bus through lead conductors, electrically operated main switch means for connecting the generator to the load bus, a voltage regulator operable to control the excitation of the field winding, energizing circuits for the switch means and field winding, a field relay for controlling said energizing circuits, said relay having electrically-operated latch means for holding it in closed position and a reset coil operable when energized to actuate the relay to its closed and latched position, manually operable switch means for closing and opening the energizing circuit for the main switch means, a reset switch operable to one position to energize the reset coil of the field relay and to another position to complete the energizing circuit for the main switch, and relay means operable to energize the latch means of the field relay in response to a predetermined generator voltage.

11. In combination, a direct-current generator having a field winding for supplying power to an energized load bus through lead conductors, electrically operated main switch means for connecting the generator to the load bus, a voltage regulator operable to control the excitation of the field winding, energizing circuits for the switch means and field winding, a field relay for controlling said energizing circuits, said relay having electrically-operated latch means for holding it in closed position and a reset coil operable when energized to actuate the relay to its closed and latched position, manually operable switch means for closing and opening the energizing circuit for the main switch means, a reset switch operable to one position to energize the reset coil of the field relay and to another position to complete the energizing circuit for the main switch, relay means operable to energize the latch means of the field relay in response to a predetermined generator voltage, and relay means operable to energize the latch means in response to the occurrence of a fault in the generator or its connecting lead conductors.

12. In combination, a plurality of direct-current generators for supplying power to a common load bus, electrically-operated switch means individual to each generator for connecting said generators to the load bus, an energizing circuit for each electrically operated switch means, a control switch operable to partially close said energizing circuit, control relay means individual to each generator responsive to the polarity and value of the generator voltage operable to complete the energizing circuits of the electrically-operated switch means of each generator, a voltage regulator individual to each generator operable to maintain a predetermined output voltage thereof, said regulators having paralleling windings, an equalizer bus common to all the generators, and an equalizer disconnecting relay individual to each generator operable to control the connection of the paralleling windings of the regulators to the equalizer bus, said relays having operating windings connected to be energized only in response to the operation of said control switches whereby the paralleling windings of the regulators are connected to and disconnected from the equalizer bus in accordance with the operation of the control switches.

13. In combination, a plurality of direct-current generators for supplying power to a common load bus, a voltage regulator individual to each generator operable to maintain a predetermined output voltage thereof, said regulators having paralleling windings, an equalizer bus common to all the generators, an electrically-operated line switch individual to each generator operable to connect the generators to the load bus, an energizing circuit for each line switch, a manually-operable control switch individual to each generator operable to partially close the energizing circuits for the line switches, relay means individual to each generator and operable in response to predetermined voltage conditions of the generators and load bus to effect a final closure of said energizing circuits, and an equalizer disconnecting relay individual to each generator operable in response to the partial closure of said energizing circuits to connect the paralleling windings of the regulators to the common equalizer bus.

14. In combination, a direct-current generator for supplying power to a load bus, electrically operated switch means operable to connect the generator to the load bus, said switch means having at least two sets of independently operable contact members connected in series circuit relation between one terminal of the generator and the load bus, said sets of contact members being normally operable substantially simultaneously in response to the energization and deenergization of said switch means, and control means including manually operable means and relay means having contact members connected in series circuit relation in a single energizing circuit common to both sets of contact members for effecting the energization and deenergization of the switch means, whereby the generator is positively disconnected from the load bus in response to the opening of either one or both of the sets of contact members.

15. In combination, a direct-current generator for supplying power to a load bus, switch means operable to connect the generator to and disconnect it from the load bus, said switch means comprising a pair of independently operable electrically operated switches having their individual circuit controlling contact elements connected in series circuit relation between one terminal of the generator and the load bus, said switches having separate operating windings, an energizing circuit for said switches, said separate operating windings being connected in parallel circuit relation in said energizing circuit, and manually operable means and relay means having contact members connected in series circuit relation to open and close the energizing circuit to effect the substantially simultaneous energization and de-energization of said separate operating windings, whereby the generator is positively disconnected from the load bus by the opening of either one or both of the switches.

BASCUM O. AUSTIN.
OMAR C. WALLEY.
DONALD W. EXNER.

REFERENCES CITED

The following references are of record in the file of this patent:

UNITED STATES PATENTS

| Number | Name | Date |
|---|---|---|
| 1,718,517 | Bany | June 25, 1929 |
| 1,911,356 | Eames | May 30, 1933 |
| 1,920,096 | McNeil | July 25, 1933 |
| 2,089,719 | Traver | Aug. 10, 1937 |
| 2,265,203 | Six | Dec. 6, 1941 |
| 2,368,953 | Walsh | Feb. 6, 1945 |
| 2,399,409 | Walley | Apr. 30, 1946 |
| 2,401,795 | Rady | June 11, 1946 |